(12) United States Patent
Nawrocki

(10) Patent No.: US 9,378,506 B1
(45) Date of Patent: Jun. 28, 2016

(54) SECURITY CHIP

(71) Applicant: Piotr Nawrocki, Inowroclaw (PL)

(72) Inventor: Piotr Nawrocki, Inowroclaw (PL)

( * ) Notice: Subject to any disclaimer, the term of this patent is extended or adjusted under 35 U.S.C. 154(b) by 0 days.

(21) Appl. No.: 14/571,201

(22) Filed: Dec. 15, 2014

(30) Foreign Application Priority Data

Dec. 10, 2014 (EP) ................... 14460115

(51) Int. Cl.
*G06Q 30/00* (2012.01)
*G06K 7/10* (2006.01)

(52) U.S. Cl.
CPC ........ *G06Q 30/0185* (2013.01); *G06K 7/10326* (2013.01)

(58) Field of Classification Search
CPC ................. G06Q 30/0185; G06K 7/10326
See application file for complete search history.

(56) References Cited

U.S. PATENT DOCUMENTS 9,059,188 B1 * 6/2015 Dimitrakopoulos .. H01L 23/573
2015/0028107 A1 * 1/2015 Fischer ............ G06K 19/07783
235/488

* cited by examiner

*Primary Examiner* — Kristy A Haupt
(74) *Attorney, Agent, or Firm* — Masuvalley & Partners

(57) ABSTRACT

A security chip against counterfeiting, especially for banknotes and other documents (e.g. pre-numbered forms), enabling the verification of the authenticity of a document.

13 Claims, 6 Drawing Sheets

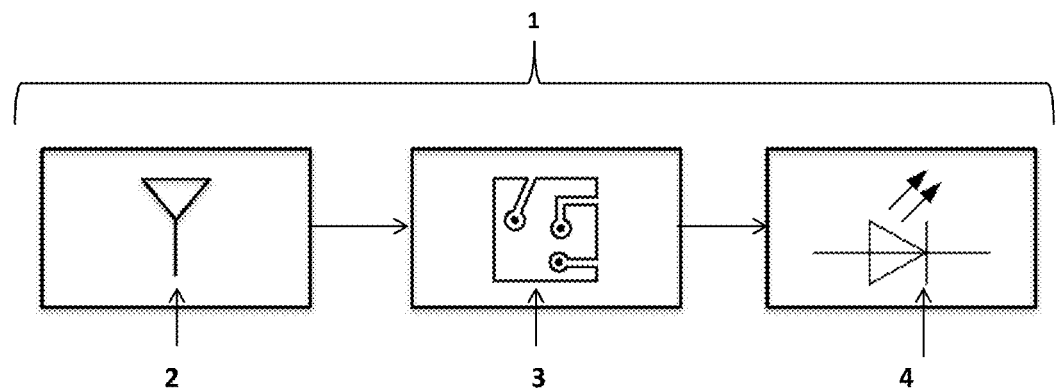
Fig. 1
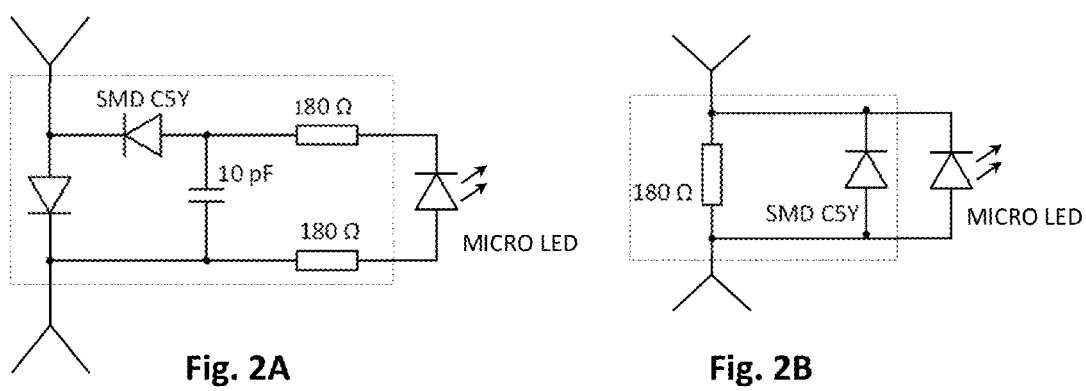
Fig. 2A                    Fig. 2B

SECURITY CHIP

RELATED APPLICATIONS

The present invention claims priority to European Patent Application No. EP14460115.0 filed Dec. 10, 2014 entitled Ukł ad zabezpieczają cy przed fał szerstwem, zwł aszcza do banknotów, which is incorporated herein by reference in its entirety.

FIELD OF THE INVENTION

The invention relates to a security chip against counterfeiting, especially for banknotes and other documents (e.g. pre-numbered forms), enabling the verification of the authenticity of a document.

BACKGROUND OF THE INVENTION

In the production of banknotes complex printing techniques are used. Thanks to security features it is easy to distinguish a genuine banknote from a counterfeit one. The authenticity of a banknote can be tested by checking the security features visible to the naked eye (e.g. a watermark, a hologram), tactile (stiff and rustling paper, printing convex in some places) and security features visible under UV light. Euro banknotes also have a number of hidden security features detected by sensors in vending machines or high-performance sorting machines used by central banks. The most sophisticated hidden security features can be verified only with the help of advanced sensors, only available to central banks. These sensors are produced only by a few companies. Thanks to them, even if a commercial bank or retail business transferred counterfeit money to the central bank, their return to the circuit would be highly unlikely.

Due to the continuous development of counterfeiting techniques constant search for new methods of document protection against illegal copying is needed. The aim of the present invention is therefore to provide a new kind of security.

This has been achieved by proposing security in the form of an electronic circuit mounted on a flexible layer of composite graphene material. Graphene has all the properties corresponding to the requirements of the production of nanocomposite material for a chip securing, for example, electricity conductivity and transparency. Additionally, in the prior art methods are known for manufacturing an electronic circuit structure (US2012217480) and an antenna (US2013004658) of graphene, the contents of which are hereby incorporated by reference.

OBJECTS AND SUMMARY OF THE INVENTION

The invention is a chip securing against counterfeiting, in particular banknotes, characterized in that it comprises an electronic circuit disposed on elastic layer of nanocomposite graphene material, comprising an antenna, an electroluminescent element and preferably also an electromotive force processing chip adapted to process the signal received by the DC powered security chip powering the electroluminescent element, wherein the elastic layer of graphene nanocomposite material comprises at least one graphene layer disposed on the adhesive layer, preferably a polymer.

Preferably, the chip comprises a capacitive touch switch configured to close the circuit chip by a finger touching the contacts.

Preferably, the switch contacts are led to the surface of at least one layer of adhesive.

Preferably, at least one component of the security chip, and preferably each component of the chip, is made of graphene, and is an integral part of the flexible layer of graphene nanocomposite material.

Preferably, the chip is designed to be excited by a GSM signal in the frequency range from 900 MHz to 2,100 MHz.

Preferably graphene is present in pure or doped form.

Preferably, the chip comprises a layer of graphene, and two adhesive layers, wherein the graphene layer is located directly between the two layers of adhesive.

Preferably graphene is in a two-dimensional form having a thickness of one atom or more than one atom or three dimensional and preferably they are nanotubes arranged in different directions, in particular parallel or perpendicular to the surface of the adhesive.

The invention also includes the use of the chip according to the invention for securing banknotes, holograms, documents, passports, credit cards, excise bands, excise forms, personal identifiers, certificates or product labels.

The present invention is further a chip for verifying the authenticity of documents, in particular banknotes comprising a security chip according to the invention and a device adapted for generating a signal exciting the chip.

Preferably, the apparatus adapted for generating a signal exciting the chip is adapted to record the signal generated by the electroluminescent element.

Preferably, the apparatus adapted for generating a signal exciting the chip is a mobile phone.

The invention also applies to a method for checking the authenticity of documents, in particular banknotes, characterized in that the chip is used according to the invention.

The security chip is made of a nanocomposite which has a binder as one component, preferably a polymer, which ensures its integrity, hardness, flexibility and resistance to compression, and the second is a monatomic layer of graphene, which provides conductive properties while maintaining the transparency of the material.

Graphene has all the properties corresponding to the requirements of the production of nanocomposite material for a security chip, for example
 electricity conductivity
 low resistivity
 high transparency
 properties of a semiconductor The security chip made with graphene is completely transparent, which allows to use it, for example, in the so-called "windows" of polymer banknotes, as the surface layer of a hologram or as an inherent solution to cover any layers requiring protection.

A source of visible light, polarized light, or UV radiation is an electroluminescent component. In the case of visible light, the end result is a visual effect discernible by a human eye. In the case of using UV light emitting element, the end result will be the backlight of fluorescent markers located within the light source. In the case of polarized light the film or printouts generated by printing, stretching, or stamping will be exposed.

The chip does not require a constant power supply to achieve the effect of electroluminescence.

The security chip is made of a composite material resistant to:
 moisture and condensation
 splashing
 water-damage
 corrosion ultraviolet dust multiple deformation changes in temperature in the range −40° C. to +70° C.

The mere presence of a graphene structure in the transparent part of a banknote is an additional security factor. Using the right equipment for the detection of graphene and using several characteristics of this material, you can examine and confirm the presence of graphene (the amount and structure). Execution of a counterfeit chip made of another material will be detected. The fact that the commercial production of graphene in the form of a single structure is not yet available for potential counterfeiters is an additional protection.

Ease of fitting a polymer nanolayer to the hologram security production process is important because of its ability to adapt to a variety of hologram manufacturing processes, as well as to the application process by hot-stamping or cold-stamping. The technological features of the security chip do not restrict the use of any of the mentioned methods.

Application of the security chip significantly increases the functionality of holograms.

The security chip according to the technological modification is not limited by the current circuit designed in the example, the shape and size of the antenna or the selection of the light emitting element meeting the technical requirements, for example limitations on thickness of the structure of a banknote.

One of the advantages of the security chip according to the invention is also the ease to verify the authenticity of a document secured by this chip, requiring only a device for the excitation of the chip, which may be, for example a mobile phone.

BRIEF DESCRIPTION OF THE DRAWINGS

The invention will now be further described in the preferred embodiments, with reference to the accompanying drawings, in which:

FIG. 1 illustrates the elements of the security chip in accordance with the present invention;

FIGS. 2A-2B illustrate the examples of the construction of the security chip in accordance with the present invention;

DESCRIPTION OF EMBODIMENTS

Polymer Banknote

Referring to FIG. 2, the security chip (1) is one of the layers of a polymer (P) banknote. The security chip in the embodiment is an integral part of the hologram, i.e. is placed on the same layer of the film with a hologram.

Figure 4:
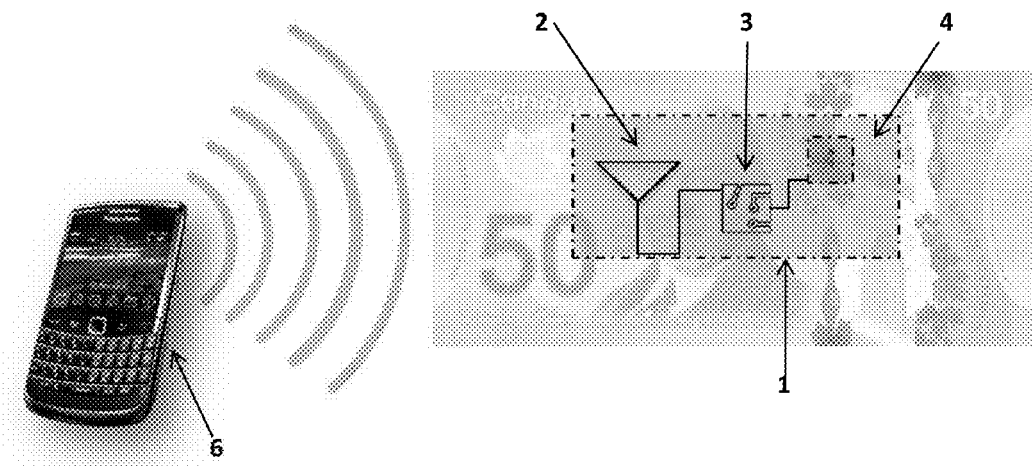
FIG. 4 illustrates the principle of the intrinsic security chip in accordance with the present invention.
Figure 5:
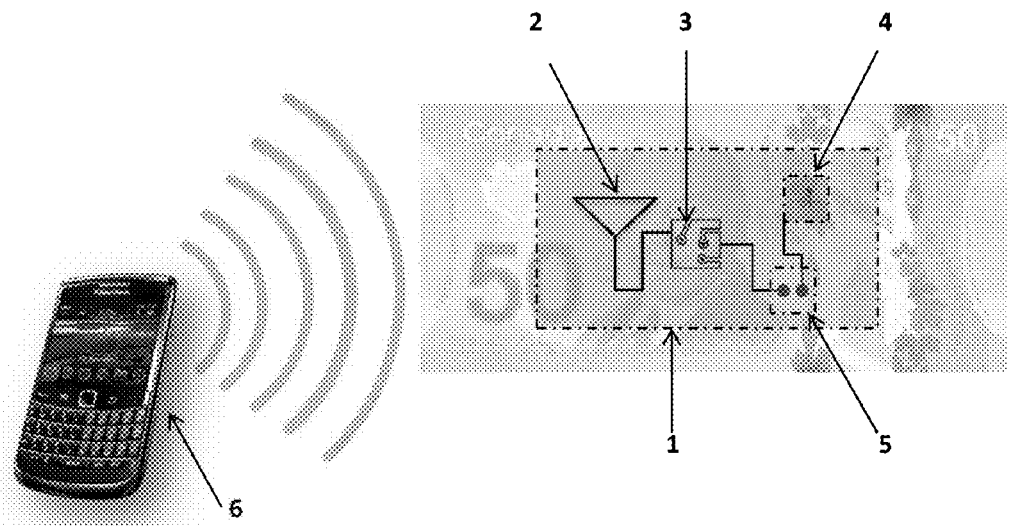
FIG. 5 illustrates the principle of the capacitive security chip in accordance with the present invention.

Referring to FIGS. 4 and 5, the chip begins to operate by applying an electromagnetic field generated using induced cell phone antenna (6). The security chip (1) is tuned in the frequency range of GSM 900 MHz to 2100 MHz.

The electrical structure of the chip (1) may have the configuration as shown in FIGS. 2A-2B.

The configuration of the antenna (2) of the chip (1) may be as shown in FIGS. 7A-7D.

Spontaneous Operation of the Security Chip.

Figure 8:
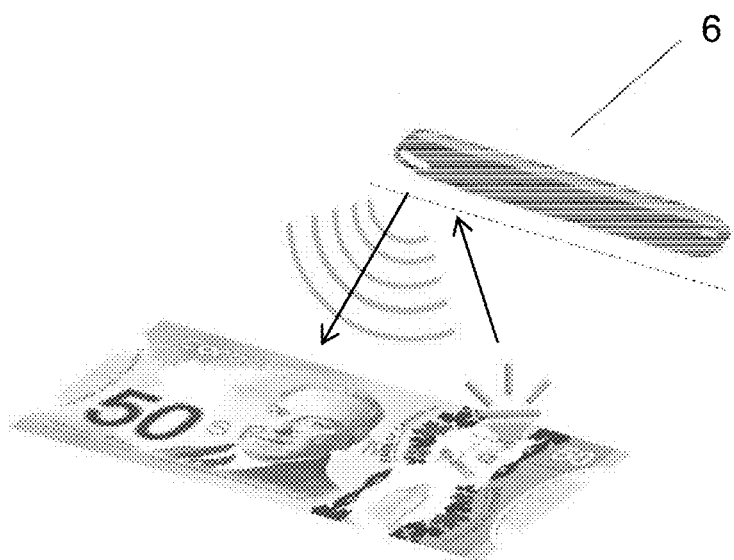
FIG. 8 illustrates the detection of the electroluminescent effect by a smartphone in accordance with the present invention.

Referring to FIGS. 1, 4 and 8, a smartphone or a phone working on GSM frequencies (6) is a control instrument inducing the security chip. The smartphone using dedicated application short-exciting the embedded antenna generates an electromagnetic field. Then bringing the smartphone nearer to the security chip (1), the signal reception by the graphene antenna occurs (2). The signal in the electromotive force processing chip (3) is converted to DC and then it powers the electroluminescent element (4), which starts to glow. The electroluminescent element (4) glows as long as the source is applied to the electromagnetic field of the security chip (1).

Spontaneous manner of the security circuit operation is illustrated in FIG. 4.

The application on a smartphone (6) also detects the chip operation (receiving glowing of the electroluminescent element) using a camera. In the event of activation of the chip—the application will notify the user with an additional message about the fact of the chip excitation.

Detection of the electroluminescent effect by a smartphone is illustrated in FIG. 8.

Application functionality allows one to easily use it and also for a blind person to verify a banknote.

Capacitive Mode of Operation of the Security Chip

Referring to FIG. 5, in another preferred embodiment, the chip (1) is made so as to operate capacitively with the circuit closed with a finger (the "touch" option). The operation of the capacitive circuits (5) is based on the phenomenon of the impact of the electric field with conductors, in particular the human body, which is filled with electrolytes and surrounded by a conductive layer of lossy dielectric—the skin. The electronic component that produces the electric field is a capacitor (5) and as with any capacitor each part of the field goes out the covers. This field is called the boundary field. The system of covers in the touch switch is designed so that the field is the greatest and directed to the area available to the user's finger. The finger located in the boundary electric field introduces a certain capacity into the chip, which is called touch capacitance (CD).

Capacitive mode of operation of the security chip is illustrated in FIG. 5.

Nanocomposite Layers Arrangement and Structure of the Nanocomposite Material

Depending on the design, the arrangement of graphene nanocomposite structure can take any form that can achieve maximum performance of the security chip during its use.

Figure 6:
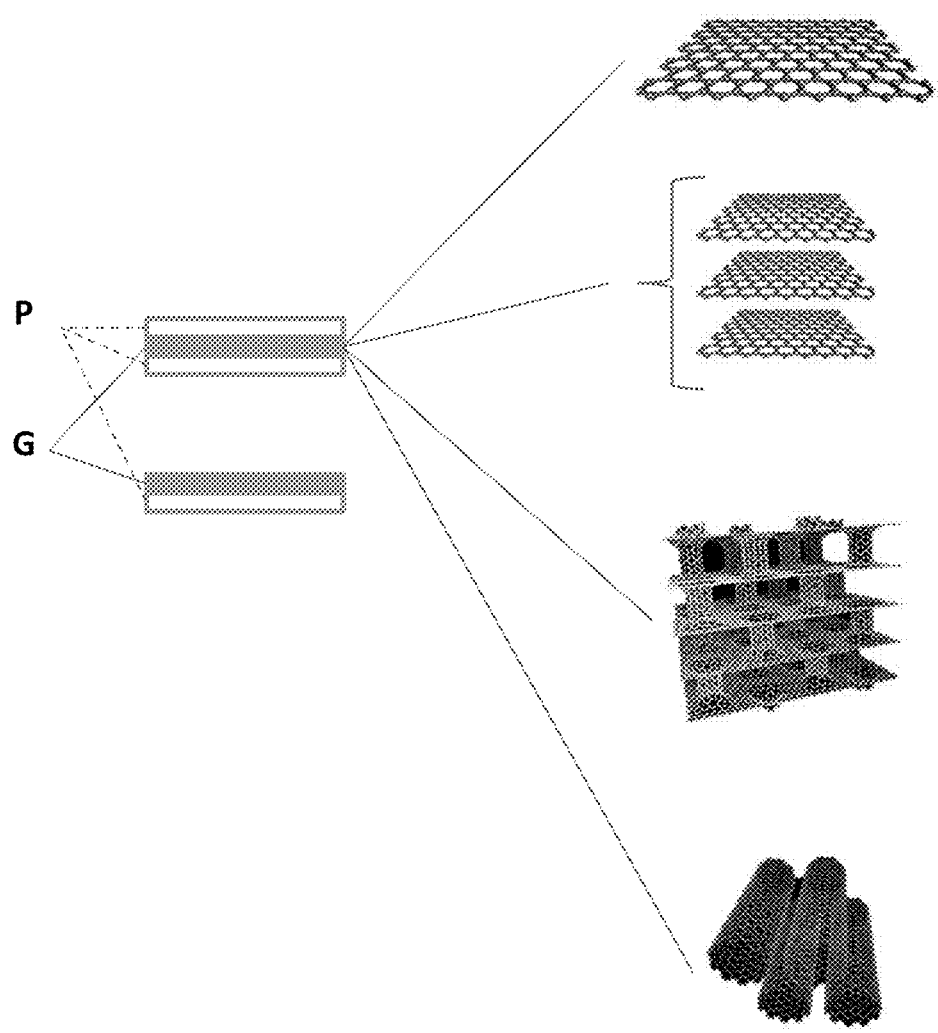
FIG. 6 illustrates examples of arrangements of layers of the nanocomposite material in accordance with the present invention.
Figure 7A:
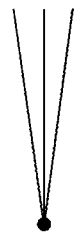
FIGS. 7A-7D illustrate the examples of the shapes of the antenna in accordance with the present invention.
Figure 7B:
Figure 7C:
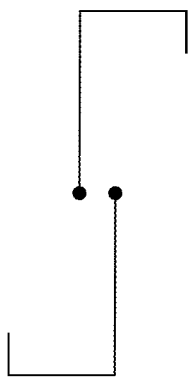
Figure 7D:
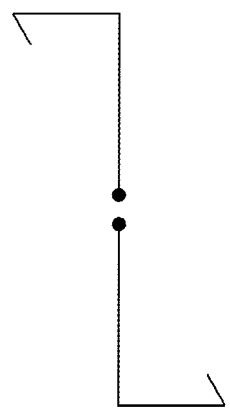

Referring to FIG. 6, the structure of the nanocomposite material security chip takes into account:

using more layers of graphene (G) in the material with a polymer layer (P)—the number of mononuclear layers depends on the conditions under which the security chip will operate.

the use of graphene (G) in the form of nanotubes, if the use of the properties of graphene, which is given by such construction are necessary to increase the effectiveness of the security chip.

doping of graphene to modify some properties of the material, e.g.: optical, electrical, electromagnetic or mechanical.

Examples of arrangement of conductive structures in nanocomposite are illustrated in FIG. 6.

Figure 3A:
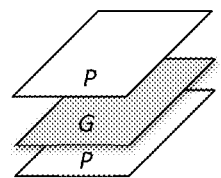
FIGS. 3A-3D illustrate the examples of arrangements of the nanocomposite layers in accordance with the present invention.
Figure 3B:
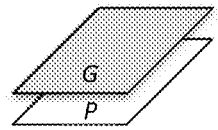
Figure 3C:
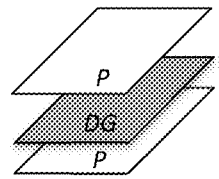
Figure 3D:
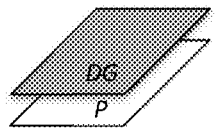

Referring to FIGS. 3A-3D and 6, the components of the nanocomposite layer should be made in one of the selected ways:

- FIG. 3A: graphene layer (G) (two-dimensional or structured, e.g. nanotubes) between two layers of polymer (P) with a pin contact on the surface of one of the two polymer layers, where the security circuit will have the "touch" option of the capacitive circuit closing touching the contacts with a finger;
- FIG. 3B: graphene layer (G) (two-dimensional or structured, e.g. nanotubes) immersed in the surface of a single polymer layer (P) when the security chip is done without the "touch" option;
- FIG. 3C: doped graphene layer (DG) (two-dimensional or structured, e.g. nanotubes) between two layers of polymer (P) with a pin contact on the surface of one of the two polymer layers, when the security circuit will have the "touch" option of the capacitive circuit closing touching the contacts with a finger;
- FIG. 3D: doped graphene layer (DG) (two-dimensional or structured, e.g. nanotubes) immersed in the surface of a single polymer layer (P) when the security chip is done without the "touch" option;

Examples of Application of the Security Chip:

Other examples of the use of the security chip are authentication of pre-numbered documents, such as:

- a passport—the chip is an integral part of the cover;
- payment cards—the top layer of the card;
- other documents in the form of a payment card, such as a driving license, ID card;
- excise bands and prints;
- personal identifiers;
- license forms, certificates, etc.;
- label for products with high value and at risk of counterfeiting;

The invention claimed is:

1. A security chip comprising an electronic circuit disposed on an elastic layer of nanocomposite graphene material comprising an antenna, an electroluminescent element and an electromotive force processing chip adapted to process a signal received by a DC powered security chip powering the electroluminescent element, wherein the elastic layer graphene nanocomposite material comprises at least one layer of graphene arranged on an adhesive layer, preferably polymer.

2. The chip of claim 1, further comprising a capacitive touch switch configured to close the circuit chip by a finger touching contacts of said capacitive touch switch.

3. The chip of claim 2, wherein the switch contacts are led to the surface of at least one layer of adhesive.

4. The chip of claim 1, wherein at least one component of the security chip is made of graphene, and is an integral part of the flexible layer of graphene nanocomposite material.

5. The chip according to claim 1, wherein said chip is adapted to excitation by the GSM signal in the frequency range from 900 MHz to 2100 MHz.

6. The chip according to claim 1, wherein the graphene is in a pure or doped form.

7. The chip according to claim 1, further comprising a layer of graphene, and two adhesive layers, wherein the graphene layer is located directly between the two layers of adhesive.

8. The chip according to claim 1, wherein the graphene is in a two-dimensional form having a thickness of one atom or more than one atom or three dimensional or nanotubes arranged in different directions, in particular parallel or perpendicular to the surface of the adhesive.

9. A method of security comprising using the chip according to claim 1 for securing banknotes, holograms, documents, passports, credit cards, excise bands, excise forms, personal identifiers, certificates or product labels.

10. The system for verifying the authenticity of documents, in particular banknotes, comprising a security chip according to claim 1 and a device adapted for generating a signal exciting the chip.

11. The system of claim 10, wherein the device is adapted to record the signal generated by the electroluminescent element.

12. The system of claim 10, wherein the device is a mobile phone.

13. The method of verifying the authenticity of documents using the system of claim 10.

* * * * *